United States Patent [19]

O'Haver

[11] Patent Number: 5,558,462
[45] Date of Patent: Sep. 24, 1996

[54] FLAT PLATE FISH SCREEN SYSTEM

[75] Inventor: George G. O'Haver, Redding, Calif.

[73] Assignee: The United States of America as represented by the Secretary of the Interior, Washington, D.C.

[21] Appl. No.: 352,753

[22] Filed: Dec. 2, 1994

[51] Int. Cl.⁶ ........................................ E02B 8/08
[52] U.S. Cl. .......................... 405/81; 210/242.1
[58] Field of Search ............................. 405/81, 83, 127, 405/80; 210/242.1, 242.3

[56]  References Cited

U.S. PATENT DOCUMENTS

| | | |
|---|---|---|
| 1,451,394 | 4/1923 | Hurst . |
| 1,825,169 | 9/1931 | Wyckoff ................................. 405/81 X |
| 4,260,286 | 4/1981 | Buchanan ............................. 405/81 X |
| 4,337,008 | 6/1982 | Kulyabko et al. . |
| 4,526,494 | 7/1985 | Eicher ......................................... 405/83 |
| 4,929,122 | 5/1990 | Yoas .......................................... 405/81 |
| 5,161,913 | 11/1992 | Boylan ...................................... 405/83 |
| 5,263,833 | 11/1993 | Robinson et al. ......................... 405/81 |
| 5,385,428 | 1/1995 | Taft, III et al. ............................ 405/81 |

OTHER PUBLICATIONS

1) "Figure 1: Plan and Section Views of typical Eicher Screen Structure." 2) "Figure 2: Profile of Modular Inclined Screen as Conceptually Designed."4) "Figure 4: Typical Rotary Drum Screen Installation." 5) "Figure 5: Johnson Intake Screen System" 6) "Figure 6: Hendrick Intake Screen System."7) "Figure 7: Typical Stationary Perforated Plate Screen Installation."

*Primary Examiner*—Frank Tsay
*Attorney, Agent, or Firm*—E. Philip Koltos

[57]  ABSTRACT

A fish screen device is adapted to be lowered to the bottom of a body of water such as a lake, river or the like and to be raised therefrom. The device includes, a housing unit including an upper flat wedge wire fish screen through which water passes and a discharge outlet for water passing through the fish screen for connection to external discharge piping. A controllable buoyancy arrangement, including a storage tank disposed within the housing unit and a compressor and control valves on shore, enables the housing unit including the fish screen to be lowered to the bottom of the body of water and to be raised therefrom. A pneumatic cleaning unit, also supplied from the compressor on shore, provides cleaning of the screen.

19 Claims, 4 Drawing Sheets

FLAT PLATE FISH SCREEN SYSTEM

BACKGROUND OF THE INVENTION

1. Field of the Invention

The invention relates to fish screens for screening fish from water intakes for various installations such as pumps, canals and ditches, generators, water diversion structures and the like.

2. The Prior Art

The U.S. Government has mandated that fish screens be installed in many waters within the United States. For example, Public Law 102–575, Title 34, Section 3406(b)(21), directs the Secretary of the Interior to "avoid losses of . . . anadromous fish resulting from unscreened . . . diversions on the Sacramento . . . river . . . and Sacramento-San Joaquin Delta . . . " Such screens are also used by private industry and others to protect fish.

Many different types of fish screens have been produced and installed over the past 20 years (and before). Nearly all of these have been custom designs for specific sites and applications. Existing screening systems are expensive because, among other reasons, these systems rarely are, and generally cannot be, mass produced. The majority of these screens are river bank designs using flat plate screens or drum screens and have problems balancing flows through and past the screens, handling debris that collect on the screen, bypassing fish and preventing predation by other fish. In the latter regard, predator fish typically congregate in the slower backwash areas near prior art screening devices and near outfall structures where juvenile fish are returned to the river.

More recently, some screen systems have been located on the river bottom and use an air or water backwash arrangement to prevent debris buildup. These screen systems, which, as will appear, are perhaps closest in concept to the screen system of the present invention, are generally cylindrical in shape and are attached, by bolting, to an underwater piping system that conveys filtered water to the pump or siphon of the water diversion structure. Such cylindrical river bottom screen systems suffer a number of important disadvantages. For example, because the systems are anchored, divers are required to install, remove, maintain and/or inspect them. Further, the air cleaning systems associated with the screens must act in all directions (up and down) thereby producing less jetting action and less effective cleaning of the bottom screen surface. Further, some arrangements provide a habitat for predator fish. In addition, balancing flows through multiple screens is often difficult because variable river conditions change the flow patterns. Also, cylindrical screens are to some extent limited to smaller installations because the complexities in cleaning, handling, and operation increase with size.

More generally, existing fish screen systems use both large screen and small screen approaches. Basically, large screen system use either drum screens or vertical wedge-wire screens and each has particular disadvantages. For example, drum screens require a regulated water surface elevation and permit passage of debris that must be handled eventually. Further, the seals are difficult, the mechanical elements require extensive maintenance and a low percentage of the screen is actually exposed to flow. Further, such drum screens are prone to substantial siltation because of the low through-screen velocities. In addition, such systems require bypasses, afford limited flexibility with changing conditions, and are difficult to maintain. Further, because of the limited flexibility associated with drum screens, sizing requires over-design, and moreover, retrofitting can be costly and difficult. Ice formation and blockage can also be a problem in some cases. Further, the predation requirements of drum screens involves 2 ft/sec. minimum forebay velocities.

Finally the cost tends to be high (approximately $2,000 to $4,000/cfs).

Vertical wedge-wire screen systems suffer disadvantages such as extensive cleaning requirements, and effective cleaning methods are typically mechanical and complex. Further, the submergence requirements of such screens contribute to over-design. In addition, sedimentation is a problem due to low through-screen velocities and debris removal and handling is difficult. The permanent nature of the screen structure limits flexibility, and the length of the structure is extensive, with no water surface elevation control. Further, modification is not easy and as with the other systems discussed above, a by-pass is required and forebay predation a problem.

Small screen systems include the following types: drum screens (paddle wheel or power); vertical wedge-wire; wedge-wire cylinders (air burst or water spray cleaned); wedge-wire ogee; infiltration gallery; perforated plate; and inclined screens. In brief, drum and vertical screens suffer the same problems as above and, in general, submergence requirements can limit installation to deep water. Further, sedimentation fouling can be a problem, and a substantial head loss is associated with some concepts. Also remote cleaning may be ineffective, ice jamming may occur in some cases, and THE CREATION of slack water zones may result in predation. Further, access, inspection and maintenance may be difficult. In addition, the cost of small screen units tends to be high (approximately $4,000 to $20,000/cfs).

SUMMARY OF THE INVENTION

In accordance with the invention, a fish screen unit or device is provided which either overcomes or minimizes the disadvantages of the prior art discussed above. According to an important feature thereof, the fish screen unit of the invention includes a flat plate fish screen and is capable of being readily placed on the bottom of a river or lake so that the screening surface is oriented in a generally horizontal plane near the bottom, and of being readily removed from this position. This positioning of the unit bottom, and the flow control means provided in accordance with a further aspect of the invention, enable control of the flow parameters across the screen face, and internal baffles of the flow control means accelerate the water to a velocity that prevents or substantially retards sediment accumulation.

The present invention overcomes the normal problems that are associated with placing a screen at the bottom of a lake or river, including difficulties with respect to installation, inspection and maintenance, by providing a controllable buoyancy system which enables the entire fish screen unit to be sunk to the bottom and floated to the surface in a precise, controlled manner. The system includes an on shore compressor and at least one buoyancy tank which is located aboard the fish screen unit and filling and emptying of which is used to control sinking and raising of the fish screen unit.

In accordance with a further aspect of the invention, a pneumatic screen cleaning system is provided for cleaning the fish screen which uses air blasts for this purpose. Preferably, the area beneath the screen is divided up into compartments and the cleaning system provides such air blasts in one compartment at a time so as to cover the entire screen. In an advantageous implementation, the sequence of air blasts is provided through spaced transverse pipe headers and starts upstream and works downstream. Preferably, the entire cleaning system, with the exception of the on shore or above water compressor referred to above and a single connecting hose, is contained within the unit. The cleaning system is fully pneumatic and is preset to perform all required cleaning when air pressure is present. Advantageously, a pneumatically driven air distribution valve controls the time duration of air bursts (burst duration) and the time between bursts (burst period) and directs the air flow to the pipe headers in a predetermined sequence, e.g., in the upstream to downstream sequence discussed above. Because the air bursts are delivered to the pipe headers over an extended period of time and the air required for a single burst or burst sequence can be stored in air tanks aboard the unit, the air capacity of the on shore air compressor is minimal.

The cleaning system of the invention contrasts with the prior art cleaning systems which generally employ electrical systems including solenoid valves and computers to provide the necessary control. In general, such electrical systems must be installed on shore in a dry environment. Also, prior art systems require extensive piping. Mechanical systems which use brushes to wipe the debris from the screen face are expensive, subject to failure and often do not provide complete cleaning.

In contrast to the prior art wherein most fish screen devices are located at the side of the river, the unit of the invention can be placed at the river center near the bottom of the river bed, with resultant attendant advantages mentioned above. Further, this placement provides an environment which is free of floating debris yet above the siltation level, and which is also more free of small fish. This location also avoids the need for fish bypass systems and debris removal systems, which make up a large part of the cost and complexity of prior art systems. This location also permits 100% of the screen area to be used under all river conditions, in contrast to prior art systems which generally require that some screen surface remain above the surface of the river to accommodate flood levels. Moreover, as mentioned above, the geometry of the flow control means and the installed position of the unit make it possible to balance hydraulic flows through the unit and, once balanced by the baffles of the flow control means, these flows remain relatively constant despite changes in river and site conditions. The high water velocities mentioned above and the advantages thereof (e.g., low sedimentation) contrast with in prior art screen units which generally have a low velocity zones at which sedimentation collects and which upset the hydraulic flow balance and/or interrupt the performance of the screen system.

The controllable buoyancy system of the invention eliminates the need for divers and makes installation and maintenance easier, in contrast to existing fish screen units which require divers for underwater work. The unit can also be removed and stored in a very short time using hand tools, a small boat and a trailer, in contrast to the prior art wherein the fish screen systems are permanently installed and usually cannot be removed without extensive effort or by total destruction of the unit itself. Disturbances to the river bottom are also minimal during installation; the unit and its associated pipes are set on the river bottom usually without any excavation. Prior art systems can require trenching, coffer dams, and underwater construction, and, as a result, extensive permits are usually necessary.

Other features and advantages of the invention will be set forth in, or apparent from, the following detailed description of preferred embodiments of the invention.

DESCRIPTION OF THE PREFERRED EMBODIMENTS

Figure 1:
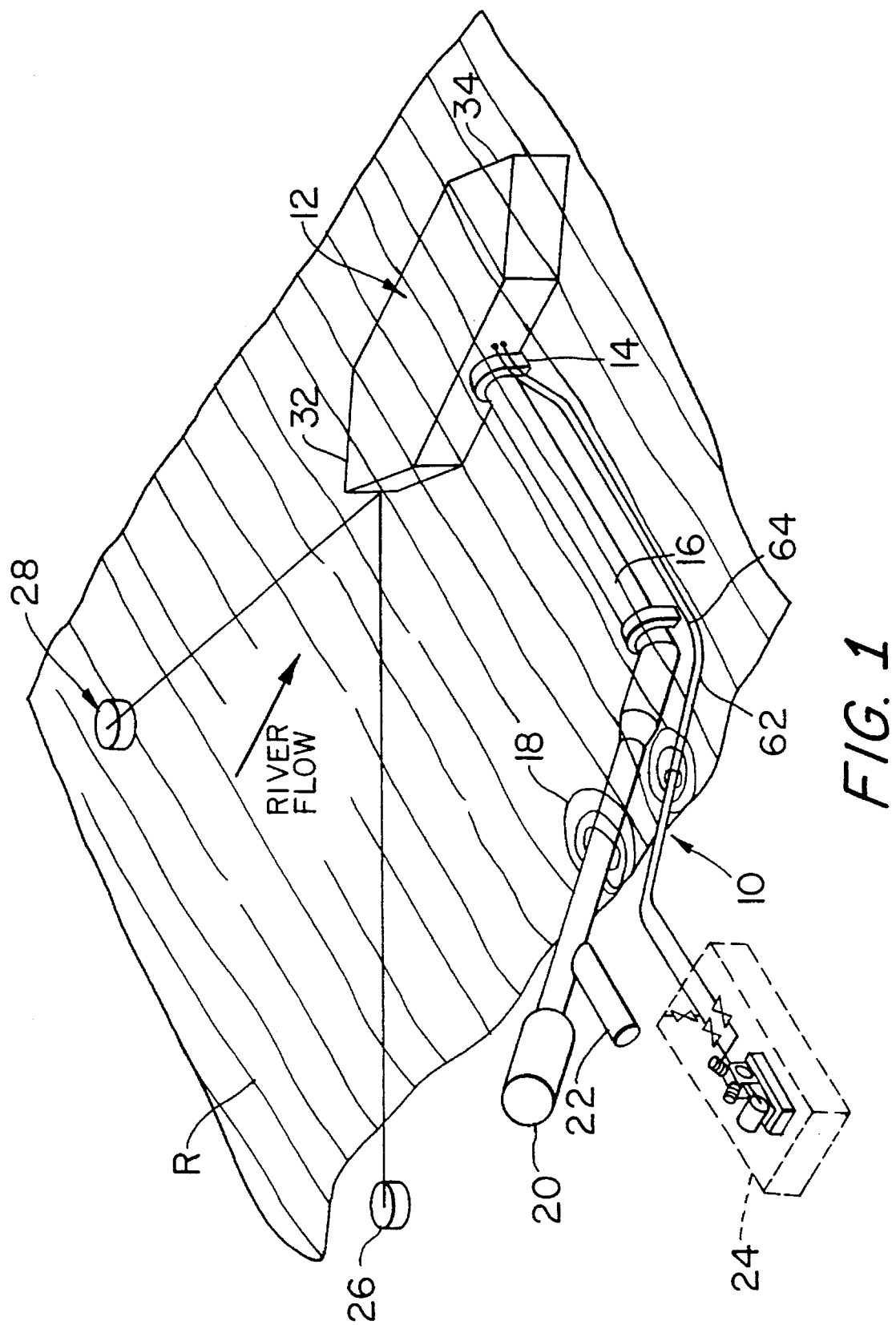
FIG. 1 is a perspective view showing a fish screen system in accordance with a preferred embodiment of the invention, anchored in place on the bottom of a river.

Referring to FIG. 1, a perspective representation is provided showing a fish screen system according to the invention in place within a river R. The fish screen system, which is generally denoted 10, includes a fish screen unit 12 shown submerged on the bottom of river R beneath the surface thereof. In the exemplary embodiment illustrated, the unit 12 includes nose and tail shields 32 and 34 and is connected by a sliding pipe connection 14 to a screen unit discharge pipe 16. A further pipe transition 18 is provided between discharge pipe 16 and an irrigation pump 20 and a pipe outlet 22 which provides water discharge to service. A cleaning air hose 62 and a buoyancy air hose 64 are connected to an air compressor unit 24 which is located on shore and which is described in more detail in connection with FIG. 3. Unit 12 is anchored in place on the bottom using a shore anchor 26 and a river anchor 28.

Figure 2:
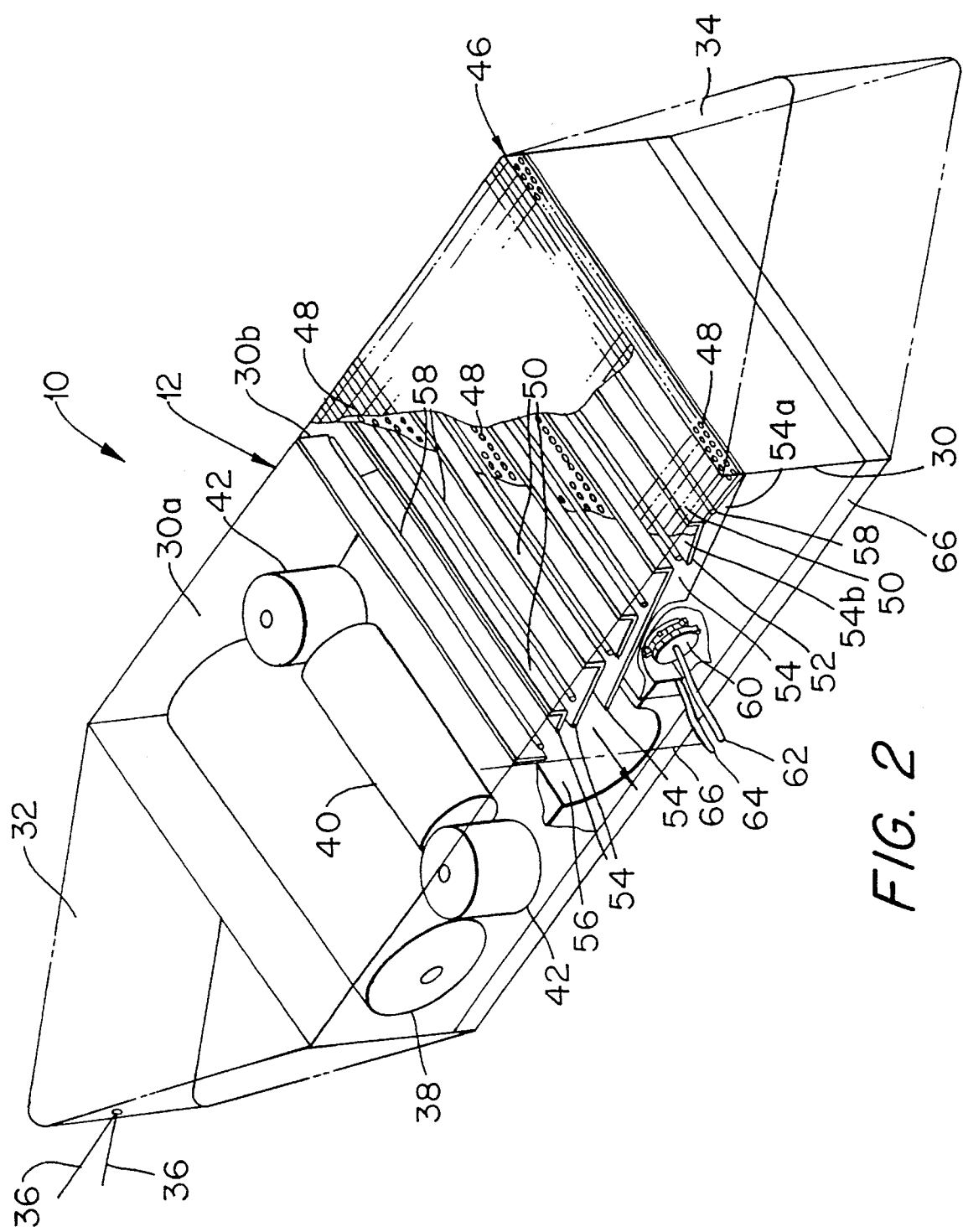
FIG. 2 is a perspective view, partially broken away and with the outer housing or casing shown in phantom lines, of a preferred embodiment of the fish screen unit of FIG. 1.

Referring to FIG. 2, the fish screen unit 12 includes a housing 30 of generally rectangular shape and including the V-formed nose and tail deflection shields 32 and 34 which were referred to above and are located at the upstream and downstream ends, respectively. Shields 32 and 34 are used to control predation, i.e., to eliminate the natural habitat for predator fish found near many fish screen constructions. Lines 36 affixed to the upstream deflection shield 32 are used to connect the unit 12 to river and shore anchors (not shown in FIG. 2) described above in connection with FIG. 1.

A first section 30a, the bottom portion of housing 30, is used to house, in the illustrated embodiment, principal air buoyancy chambers 38, shown extending transversely of housing section 30a, screen air cleaning tanks 40 also extending transversely, and two pairs of upright secondary buoyancy air chambers 42 disposed at the opposite ends of tanks 40. In an advantageous exemplary embodiment, two principal air buoyancy chambers, two air cleaning storage tanks and four secondary buoyancy air chambers are provided, although it will, of course, be understood that different numbers and arrangements of units can be used.

A second, screening section 30b, the upper portion of the housing 30, includes an upper wedge wire flat plate screen 46 with the wedge wires in the screen oriented perpendicular to the stream flow. Positioned therebeneath are a series of orifice plates 48, one full plate and broken away parts of five other plates being shown in FIG. 2. Orifice plates 48 are separated by vertical baffles 50 and are disposed between plates 48 and screen 46 which divide the space beneath screen 46 into six separate chambers. Baffles 50 are part of a flow control structure 52 that also includes integral inclined flow control baffles or plates 54 which are configured as shown and which divide and control the flow from the orifice plates 48 to a discharge pipe 56 which forms part of, or communicates with, discharge pipe 16 of FIG. 1. As illustrated, flow control baffles 54 comprise alternative long and short baffles of which 54a and 54b shown at the downstream end are exemplary. The internal baffles 54 accelerate the water within the unit 12 and the connecting piping system (including discharge pipe 16) to a velocity which greatly retards the accumulation of sediment and debris. The higher velocity also permits the use of a smaller discharge pipe 16 and results in a more compact unit 12. A series of screen cleaning air pipe headers or spargers 58 are disposed within the space between plates 48 and screen 46 in the six chambers defined by baffles 50.

The pipe headers or air pipes 58 each have a series of upwardly opening holes or upright outlets (not shown in FIG. 2) located along the length thereof and spaced apart such that the entire screen 56 is cleaned by the jetting action of the air blasts through headers 58. Only one compartment is cleaned at a time and the compartments are preferably cleaned sequentially from upstream to downstream with the cleaning periods of the different compartments being spaced approximately 10 to 60 seconds apart.

As explained in more detail below in connection with FIG. 3, the pipe headers 58 are fed by screen cleaning air valve unit indicated at 60 together with other pneumatic equipment. The screen air supply hose 62 referred to above is connected to valve unit 60 while the buoyancy air supply hose 64 supplies air to buoyancy chambers 38 and 42.

Discharge pipe 56 has a center line symmetrical about the vertical axis indicated at 66 and is connected through a slip joint (not shown in FIG. 2) to the further discharge piping (pipe 16 etc.) described above in connection-with FIG. 1.

The housing 30 is preferably a fiberglass or similar plastic outer case and a concrete ballast 66 can be used as required to provide ballasting of the unit 12.

Figure 3:
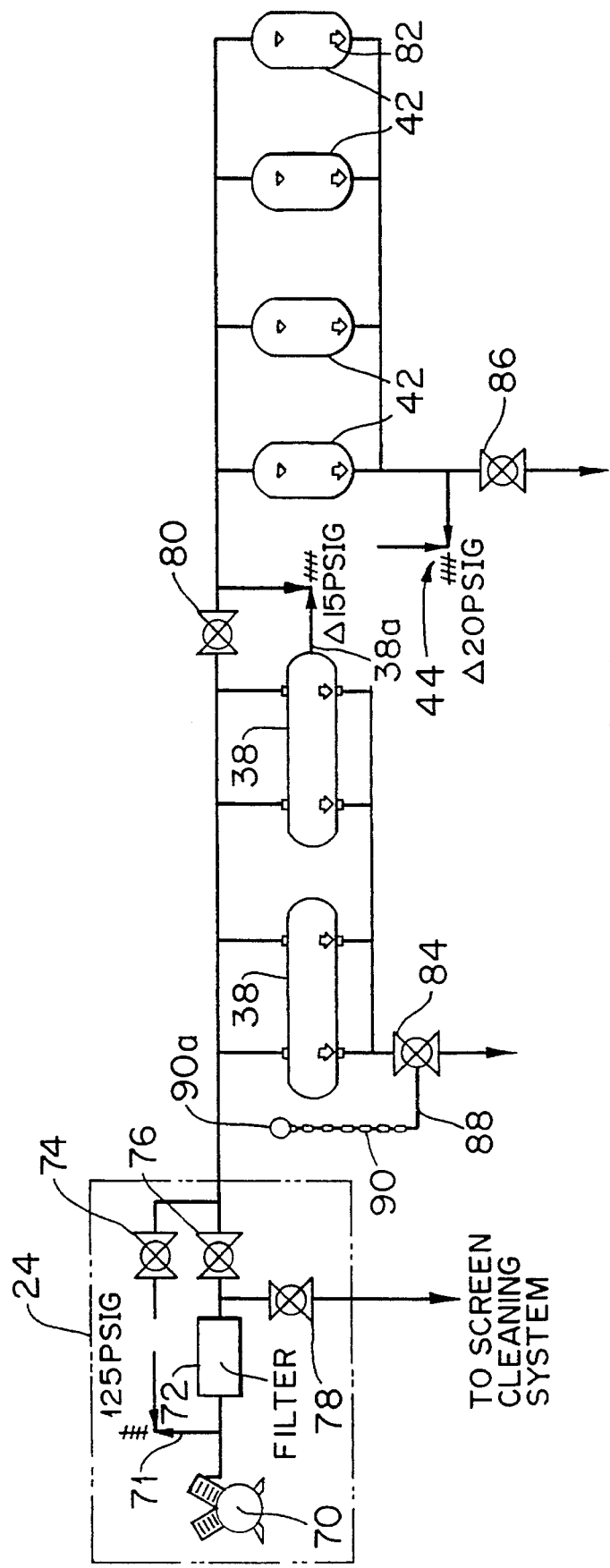
FIG. 3 is a schematic diagram of a preferred embodiment of the buoyancy air supply system for the fish screen unit of the invention.

Referring to FIG. 3, a schematic circuit diagram is provided of the pneumatic circuit for raising and lowering the fish screen unit 12. The system includes two primary buoyancy tanks 38 and four second buoyancy tanks 42 corresponding to those described above in connection with FIG. 2, and a compressor 70 (typically 25 scfm, 125 psi) which provides system air and which is located in the on shore compressor unit 24 described above, together with a pressure release valve 71, a filter 72, a vent shut-off valve 74, a buoyancy air supply valve 76 and a cleaning air supply valve 78, connected as shown. Valve 78 is connected in a line (in communication with or corresponding to hose 62 of FIG. 2) that provides communication with the screen cleaning system described in more detail below.

Compressor unit 24 is connected by a connection corresponding to hose 64 of FIG. 2, and additional branch connections as illustrated, to primary tanks 38 and through a secondary buoyancy tanks isolation valve 80 to secondary tanks 42. Each of the tanks 38 and 42 include a floating ball water drain valve (indicated at 82 for the right most of the secondary tanks 42) which will not release air.

A primary buoyancy tank's flooding valve 84 is connected to primary tanks 38 and a secondary buoyancy tank's flooding valve 86 is connected to secondary tanks 42. Valve 84 includes an activation or operating handle 88 connected to a chain 90 having a gripping member or handle 90a at the surface so as to permit opening of the valve 84 by pulling on the chain 90.

Considering the operation of the screen buoyancy system, initially with the screen unit or device 12 is floating, the buoyancy tanks 38 and 42 are all full of air and all isolation valves are closed. Next, secondary buoyancy tank flooding and isolation valves 80 and 86 are opened as well as vent shut off valve 74 on shore. The secondary tanks 42 are used to level and sink the unit 12 until the unit is just submerged. Typically, secondary tanks 42 will be about 75% full of water under this condition. The secondary tank flooding and isolation valves 80 and 86 are then closed. The latter step will require the use of a boat but not a diver since the unit 12 is just submerged.

At this time, fish screen unit 12 is permitted to descend to the bottom of the river. Once the unit 12 is correctly located on the bottom, the primary buoyancy tank flooding valve 84 is opened by pulling on the gripping member 90a of the chain 90 connected to the operating handle for valve 84 until chain 90 comes loose and is released from the unit 12. As a result of opening valve 84, primary tanks 38 will be filled with water and the fish screen unit 12 will be ready for use.

To raise the fish screen unit 12 from the bottom to the surface, vent shut off valve 74 is closed and buoyancy air supply valve 76 is opened in order to provide at least 50 psig air to the buoyancy tanks 38 and 40. The primary tanks will empty the water therein first through their primary floating ball water drain valves (corresponding to valve 82) and flooding valve 84. The floating ball water drain valves will close when all water has been discharged. When the pressure in the primary tanks 38 reaches 15 psig, air will be discharged through the corresponding pressure relief valve thereof 38a into the secondary tanks 42. As the pressure in the tanks 42 increases, the pressure relief valve 44 will open and tanks 42 will fill with air. The fish screen unit 12 will surface at some time during this filling event. Once the fish screen unit 12 is on the surface, isolation valves 76 and 80 are closed to maintain buoyancy.

Figure 4:
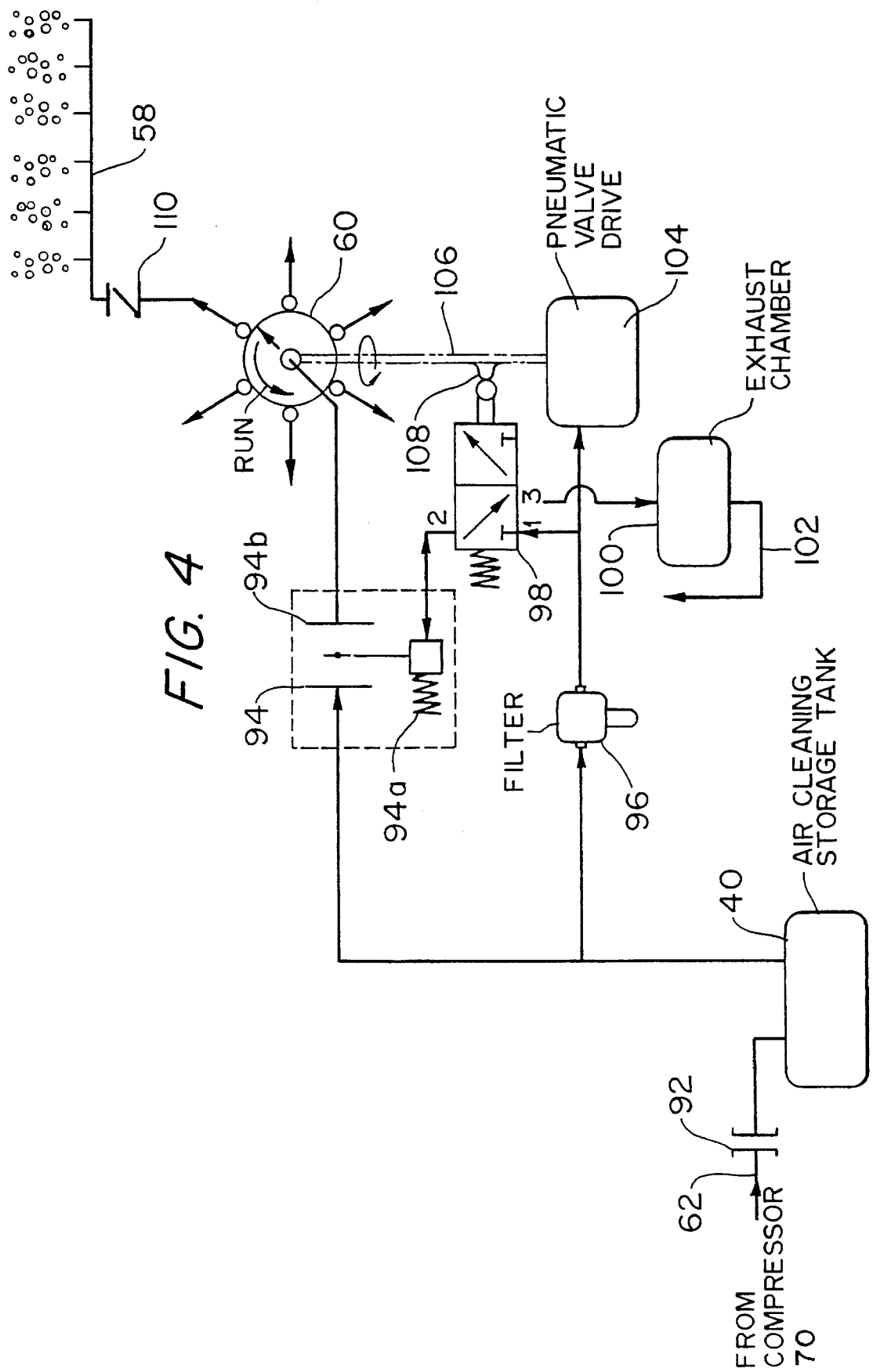
FIG. 4 is a schematic diagram of a preferred embodiment of the screen cleaning air system for the fish screen unit of the invention.

Referring to FIG. 4, a schematic circuit diagram is provided of the basic elements of the air cleaning system mentioned above. The system includes an input line which is in communication with or corresponds to hose 62 of FIG. 2 and is connected to on shore compressor 70 through cleaning air supply valve 78 as described above in connection with FIG. 3. This line is connected through a quick coupler 92 to the air cleaning storage tank 40 described above in connection with FIG. 2. Tank 40 is connected through a normally closed pneumatically activated valve unit 94 to a distribution valve unit 60 corresponding to that shown in FIG. 2. Valve unit 94 includes a spring 94a which biases the valve 94b into the closed position thereof and, in an exemplary embodiment, a minimum pressure of 60 psi is needed to open the valve 94b.

Tank 40 is also connected through a filter 96 to the input port of a three-way, three-port, two position, roller operated pilot valve 98 which supplies pressure through a second port thereof to valve unit 94 to control the operation thereof. A third exhaust port of pilot valve 98 is connected to an exhaust chamber 100 which exhausts to ambient through output line 102.

The output of filter 96 is also connected to a pneumatic valve drive unit 104 which is connected by a mechanical drive shaft 106 to distribution valve 60. Drive shaft 106 also includes a cam 108 formed thereon which actuates pilot valve 98 with a cam action during rotation of drive shaft 106. Thus, drive shaft 106 drives distribution valve 60 as well as actuates pilot valve 98. In a non-limiting, exemplary embodiment, the rotational speed of drive shaft 106 is about 0.1 to 0.2 rpm and pneumatic valve drive unit 104 operates between 50 and 120 psig.

Distribution valve 60 includes a plurality of outputs (six in the exemplary embodiment under consideration) and when an output is moved to the active position thereof, a connection made to the corresponding sparger or pipe header 58 described above in connection with FIG. 2. As described, six sparger headers 58 are provided and these are supplied successively by distribution valve 60. A check valve 110 is connected between the output of distribution valve 60 and sparger header 58.

It will be appreciated from the foregoing that with the arrangement described in FIG. 4, air from on shore compressor 70 is supplied to pneumatic valve drive 104 which, through cam 108, controls the operation of pilot valve 98, and thus valve unit 94, and which, through shaft 106, controls operation of distribution valve 60, so that the sequential supply of screen cleaning air described above is supplied to pipe headers 58.

As will be apparent from the foregoing, the invention readily enables the screening surface 46 of the fish screen unit 12 to be placed on a horizontal plane near the bottom of the river or lake. This is important because, in general, fish screen devices or units must provide evenly distributed flows through the screen surface and the flow velocities must be kept below specific values in order to prevent the impingement of fish. The bottom placement provided by the invention enables control of the hydraulics of the unit 12 using the arrangement and geometry of the internal baffles and orifices described above. As a consequence, the flow parameters across the face of screen 46 remain substantially constant under nearly all river and site conditions.

Briefly summarizing some of the many other advantages of the invention (most of which have been at least mentioned above), 100% of the screen surface is utilized at all river flows and elevations. Fish bypass systems are not required, trash and debris collection and removal systems are not required, and the screened intake is above the river bottom silts and below the floating debris. Further, the screen is located where there is the least concentration of small fish (typically the center of a river about four to six feet off the bottom). Velocities through the screen are preset and balanced for use in all river flows and elevations; no further adjustments are required. The screen unit can be raised to river surface for maintenance or inspection without divers. Moreover, the screen is portable; it can be used at multiple sites, or kept in dry storage during the non-use season and transport is possible with a trailer. Disturbances to river bottom and riparian river banks are minimal during initial installation. Maintenance is accomplished with common hand tools. Screen cleaning is accomplished by a simple air-purge system which does not use electrical devices or complex mechanical sweeping devices; only a simple (25 scfm) air compressor on shore is required. Higher water velocities within the screen water passages and the conveyance pipe keep sedimentation in these components at a minimum. Finally, the cost will be very competitive due to the maximum utilization of screening surface area, and due to the mass production techniques that can be used. In this regard, parts will be interchangeable with any other screen unit and spares will be readily available.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A fish screen device adapted to be lowered into a body of water such as a lake, river or the like and to be raised therefrom, said device comprising:

a housing unit including a flat fish screen through which water passes and a discharge outlet for water passing through the fish screen for connection to external discharge piping; and controllable buoyancy means, disposed within said housing unit, for enabling the housing unit including the fish screen to be lowered to the bottom of a body of water and to be raised therefrom.

2. A device as claimed in claim 1 wherein said screen is located on an upper surface on said housing unit spaced from the bottom of the housing unit so that when said housing unit is disposed on the bottom of the body of water said screen is spaced above the bottom of the body of water.

3. A device as claimed in claim 2 wherein said screen comprises a wedge wire flat plate screen.

4. A device as claimed in claim 1 wherein said buoyancy means includes at least one buoyancy tank disposed within said housing unit, a hose connecting the at least one tank to a compressor located, in use, the shore of the body of water and valve control means for controlling, filling and emptying of said at least one tank.

5. A device as claimed in claim 4 wherein said buoyancy means includes at least one primary buoyancy tank and at least one secondary buoyancy tank and said valve control means includes means for filling and emptying of said primary and second tanks at different times.

6. A device as claimed in claim 1 wherein said fish screen extends over of at least a portion of an upper surface of said housing unit, and wherein said unit further includes a water flow control means, disposed within said housing unit beneath said screen, for accelerating the rate of flow of water passing through the fish screen within the unit and the discharge pipe so as to retard accumulation of sedimentation and debris.

7. A device as claimed in claim 6 wherein said water flow control means includes an orifice plate means, disposed beneath said screen and including a plurality of orifices therein, for creating a plurality of flow paths through said orifices, and a baffle construction disposed below said orifice plate means for directing the water passing through said orifice means to said discharge outlet.

8. A device as claimed in claim 7 wherein said flow control means further includes a plurality of vertical baffles which divide the space beneath the fish screen into a plurality of transverse compartments and said orifice plate means comprises a plurality of orifice plates individually disposed within respective ones of said compartments.

9. A device as claimed in claim 8 wherein said baffle construction includes a plurality of inclined baffle plates forming inclined, channels beneath said orifice plates for directing water flow from said fish screen upstream to said discharge outlet.

10. A device as claimed in claim 9 wherein said baffle plates include plates of a first length alternating with plates of a second, relatively shorter length.

11. A device as claimed in claim 1 wherein said unit includes V-shaped shields at opposite ends thereof.

12. A device as claimed in claim 1 wherein said screen comprises a wedge wire flat plate screen.

13. A device as claimed in claim 1 further comprising pneumatic means disposed within said unit for cleaning said fish screen.

14. A device as claimed in claim 13 wherein said pneumatic means includes a plurality of longitudinally spaced pipe headers, disposed beneath said screen and extending transversely thereof, for directing air upwardly against said screen.

15. A device as claimed in claim 14 wherein the space beneath said screen is divided up into a plurality of chambers and an individual one of said pipe headers is located in each of said chambers, said pneumatic means further comprising distribution valve means for supplying air to said pipe headers in sequence at spaced time intervals.

16. A device as claimed in claim 15 wherein said pneumatic system includes at least one screen air cleaning tank located within said housing unit.

17. A device as claimed in claim 16 further comprising a connecting hose for connecting said tank to an air supply source disposed, in use, on shore.

18. A fish screen device adapted to be lowered into a body of water such as a lake, river or the like and to be raised therefrom, said device comprising:

a housing unit including a flat fish screen through which water passes and an discharge outlet for water passing through the fish screen for connection to external discharge piping;

controllable buoyancy means, including at least one buoyancy tank, disposed within said housing unit for enabling the housing unit including the fish screen to be lowered to the bottom of a body of water and to be raised therefrom; and pneumatic cleaning means, including at least one air storage tank disposed within said housing unit, for cleaning said screen.

19. A device as claimed in claim 18, further comprising a compressor unit adapted to be located on shore and connected through valve means to said buoyancy tank and said air storage tank.

* * * * *